(12) United States Patent
Carmel et al.

(10) Patent No.: US 12,020,317 B2
(45) Date of Patent: *Jun. 25, 2024

(54) SYSTEM AND METHOD FOR A LOAN TRADING EXCHANGE

(71) Applicant: POLLYEX, INC., San Francisco, CA (US)

(72) Inventors: Adam Carmel, San Francisco, CA (US); Karson Miller, Half Moon Bay, CA (US)

(73) Assignee: Polly Ex, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,221

(22) Filed: May 22, 2023

(65) Prior Publication Data

US 2023/0325912 A1    Oct. 12, 2023

Related U.S. Application Data

(63) Continuation of application No. 17/472,597, filed on Sep. 11, 2021, now Pat. No. 11,763,378.

(51) Int. Cl.
  *G06Q 30/08*    (2012.01)
  *G06Q 30/0201*   (2023.01)

(52) U.S. Cl.
  CPC ......... *G06Q 30/08* (2013.01); *G06Q 30/0206* (2013.01)

(58) Field of Classification Search
  CPC .............................. G06Q 40/00; G06Q 30/08
  USPC .......................................................... 705/35
  See application file for complete search history.

(56) References Cited

U.S. PATENT DOCUMENTS

| | | | | |
|---|---|---|---|---|
| 6,088,686 | A * | 7/2000 | Walker | G06Q 20/10 235/383 |
| 7,191,150 | B1 * | 3/2007 | Shao | G06Q 40/08 705/36 R |
| 7,698,214 | B1 | 4/2010 | Lindgren | |
| 8,185,466 | B2 * | 5/2012 | Martinez | G06Q 40/00 705/37 |

(Continued)

OTHER PUBLICATIONS

Park et al., "Recommendation of investment portfolio for peer-to-peer lending with additional consideration of bidding period." Annals of Operations Research 315.2 (2022): 1083-1105, Oct. 14, 2021, Springer Science+Business Media, LLC.

*Primary Examiner* — Kirsten S Apple
(74) *Attorney, Agent, or Firm* — Build IP, LLC; Robert V. Donahoe (57) ABSTRACT

A computer implemented method for committing to a sale of loan products to selected buyers using a software application. The method includes establishing a plurality of pools using the application, each of the plurality of pools defined by a buyer selected from the prospective buyers and at least one characteristic common to each of the loan products placed in the respective pool; configuring a graphical user interface to allow a seller to place each of the loan products offered for sale in one of the plurality of pools, respectively; and receiving from the seller a single user input via the graphical user interface, the single user input committing the sale of the loan products in each of the plurality of pools, respectively. A commitment to the sale of the loan products in each of the plurality of pools occurs together on receipt of the single user input.

20 Claims, 7 Drawing Sheets

(56) References Cited

U.S. PATENT DOCUMENTS

| | | | |
|---|---|---|---|
| 8,521,644 B1* | 8/2013 | Hanson | G06Q 40/06 705/37 |
| 2002/0069160 A1* | 6/2002 | Olin | G06Q 40/00 705/36 R |
| 2002/0091621 A1* | 7/2002 | Conklin | G06Q 40/04 705/37 |
| 2003/0105708 A1* | 6/2003 | Lee | G06Q 40/04 705/38 |
| 2003/0144950 A1* | 7/2003 | O'Brien | G06Q 40/06 705/38 |
| 2004/0128227 A1* | 7/2004 | Whipple | G06Q 40/03 705/38 |
| 2004/0128235 A1* | 7/2004 | Kemper | G06Q 40/02 705/38 |
| 2004/0153384 A1* | 8/2004 | Whipple | G06Q 40/12 705/35 |
| 2005/0102226 A1 | 5/2005 | Oppenheimer et al. | |
| 2005/0273406 A1* | 12/2005 | Lebda | G06Q 40/00 707/999.1 |
| 2007/0142925 A1* | 6/2007 | Heinzmann | G06F 16/24532 700/28 |
| 2007/0192237 A1* | 8/2007 | Duoos | G06Q 40/03 705/38 |
| 2008/0126267 A1* | 5/2008 | Rosen | G06Q 40/06 705/36 R |
| 2008/0249809 A1* | 10/2008 | Rosen | G06Q 40/06 705/38 |
| 2010/0205116 A1 | 8/2010 | Erlanger | |
| 2010/0262534 A1 | 10/2010 | Kaufman | |
| 2014/0129421 A1 | 5/2014 | Turnham | |
| 2014/0279683 A1 | 9/2014 | Campbell | |
| 2017/0128841 A1 | 5/2017 | Sloan | |
| 2023/0079889 A1 | 3/2023 | Carmel et al. | |
| 2023/0081242 A1 | 3/2023 | Carmel et al. | |
| 2023/0082727 A1 | 3/2023 | Carmel et al. | |
| 2023/0128463 A1 | 4/2023 | Carmel et al. | |

* cited by examiner

SYSTEM AND METHOD FOR A LOAN TRADING EXCHANGE

BACKGROUND OF INVENTION

1. Field of Invention

This invention relates generally to the sale of loans. More specifically, at least one embodiment relates to a system and method for a loan trading exchange.

2. Discussion of Related Art

Today's mortgage market is very large and can impact the wider U.S. economy. The market includes loan origination, loan servicing, and loan sales on the secondary market. The secondary market is the market for buying and selling mortgages. If a mortgage originator sells the mortgage in the secondary market, the purchaser of the mortgage can choose to hold the mortgage itself or to securitize it in a mortgage-backed security ("MBS"). Because most mortgages are sold, the secondary market is substantial.

Traditionally, the secondary market employs a bid-auction approach to connect loan sellers to loan buyers. Some current approaches employ software applications to allow sellers to solicit bids from multiple buyers, evaluate competing bids and commit to loan-sales transactions with the successful bidders. The daily volume for a single loan originator turned seller can be significant. For example, depending on the size of the seller these commitments can total from 100-250 mortgages worth tens of millions of dollars in total, each day.

Typically, as bids are received, a seller operating in the environment provided by a loan-sales software application manually organizes the loans into groups, for example, where each group includes a single buyer and one or more loans that have common characteristics. Generally, the seller selects the winning bids in the manner that the seller find meets their goals for maximizing value and maintaining compliance with the seller's internal guidelines. The bid process is dynamic and can take many hours for the seller to evaluate prior to completing the commitment process for all the loans in their pipeline that day. One drawback to current approaches is that the commitments are made one loan-group at a time. Further, the seller assumes some risk because the buyers' bids are estimates. The actual purchase price can vary due to price fluctuation between acceptance of a bid relative to a benchmark and the value of the benchmark when the commitment is made.

Figure 1:
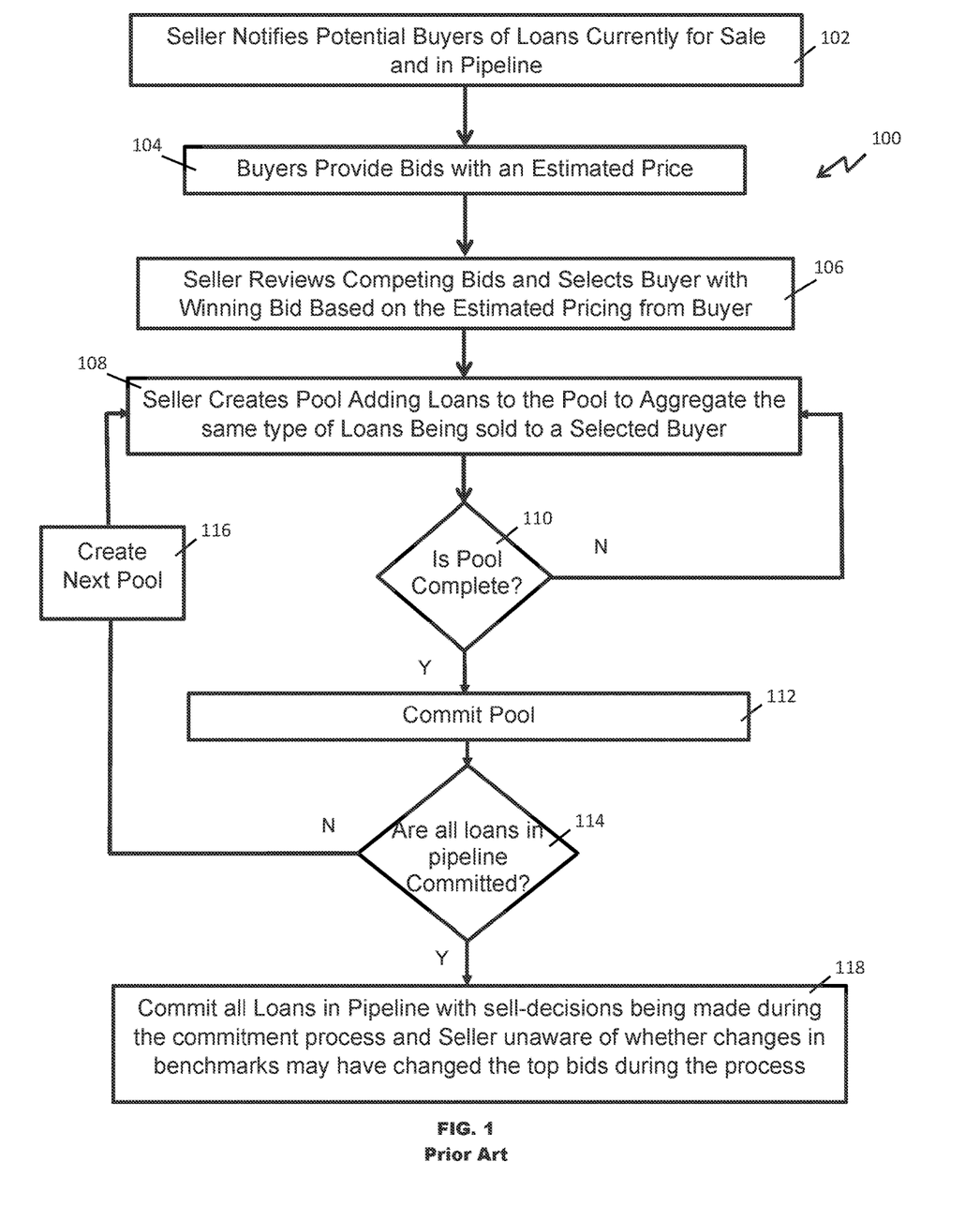
FIG. 1 illustrates a process to sell loans according to the prior art.

Referring to FIG. 1, a conventional commitment process is illustrated. The process 100 begins at an act of notifying buyers of the availability of loans 102. Here, the seller notifies buyers of the loans available in their pipeline for sale that day. Buyers offer bids at an act of receiving bids 104 following the act of notifying buyers 102. In practice, these bids are estimates because they are tied to a benchmark with a value that is constantly changing throughout the day. For example, the benchmark may be a uniform mortgage-backed security offered by Freddie Mac or Fannie Mae. In some cases, the buyer shares the identity of the benchmark. However, the seller is unaware of the difference in value between the buyers offer and the benchmark. Consequently, the seller only understands an estimated value of the bid and is unable determine the value of the offer with certainty. Efforts to "timestamp" actual bid-values based on receipt-times of offers are ineffective because the software application that hosts the auction process is separate from the communication system. For example, the auction application is separate from the email application employed to communicate bids.

The auction process 100 continues at an act of reviewing competing bids and selecting buyers 106. Here, the seller reviews the estimated value of the bids for the loans and determines the winning bidders. As mentioned above, the seller organizes the loans into groups ("pools") before committing to the sale with a selected buyer. For example, the seller may create a first group by aggregating certain types of loans that are being sold to a selected bidder into a first group and loans of the same type being sold to a second bidder into a second group. However, current approaches require that each group or pool be committed individually.

The serial nature of this process is illustrated in FIG. 1. For example, the process includes the act of adding loans to a selected pool 108. The process continues with an act of determining whether a single pool of loans is complete 110 to determine whether the seller can proceed to commit to the sale of that pool to the buyer. If not, the process returns to the act of adding loans to the pool 108. When the seller determines that the single pool of loans is complete at the act 110, the process 100 moves to an act of committing the pool 112.

Because the commitment process is performed serially pool-by-pool, the process 100 moves to an act of determining whether all the loans in the pipeline are committed 114. If the seller has additional loans in the pipeline for that business day, the process moves to an act of creating the next pool 116. Here, the seller again adds loans to a newly selected pool at the act 108 and determines whether the pool is complete at the act 110. The seller continues to add loans to the pool and then commits the next pool at the act 112. The process steps 116, 108, 110, 112 and 114 are continuously repeated until all the loans in the pipeline are committed as determined at the act 114.

An act 118 represents completion of the commit for all the loans in the pipeline. The act 118 also highlights that the entire process 100 is performed over a period of hours with the seller only operating with knowledge of estimate bid values. That is, throughout the process the seller remains unaware of the bid values with certainty. The result is that the pools of loans are committed with the seller lacking a precise understanding of the current market value of the buyers' bids.

Figure 2:
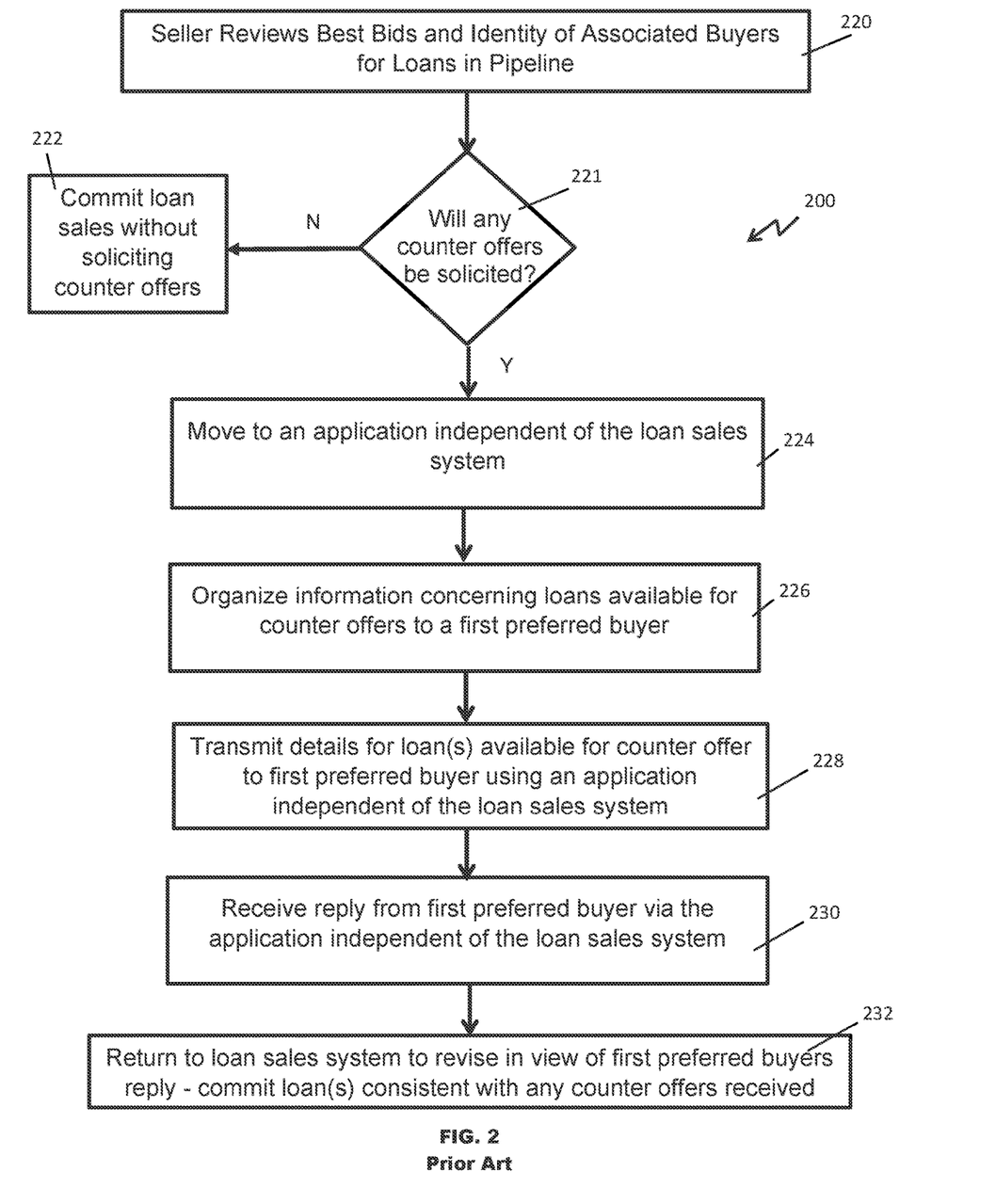
FIG. 2 illustrates a process to solicit counter offers according to the prior art.

As a courtesy, in some current approaches, a seller follows-up with a bidder to provide another opportunity where the bidder's current bid is not a winning bid. The seller's notification and reply (for example, a counteroffer) provided by the bidder is completed prior to committing the loan or loans subject to the seller's notice. Referring to FIG. 2, a conventional approach to soliciting counter offers is illustrated. The process 200 begins with an act of the seller reviewing best bids 220. Here, the seller identifies the winning bidder for loans in the seller's sales pipeline. The process moves to an act of the seller determining whether any counter offers will be solicited 221. For example, the seller's evaluation performed at the act 221 can be a result of the seller determining that the current distribution of winning bidders does not meet their goals for the percentage of loans going to one or more selected bidders. If counter offers will not be solicited, the process 200 moves to an act of committing the loans without counteroffers 222.

If counter offers are solicited, the process moves to an act of leaving the loan sales application 224. That is, while the loan sales process is preformed in a software application accessible to the seller and the bidders, these applications do not support communications concerning counteroffers. Instead, the process 200 moves to an act of organizing information concerning loans available for counter offer 226. Here, the seller must organize the details concerning various loans and the associated bids relevant to the buyer who is receiving a solicitation for counteroffers. The seller may be generating a PDF document, spreadsheet or other table with the loan details. Regardless, the seller leaves the loan sales application and generates the document(s) using a different application.

The process then moves to an act of transmitting the information 228. Here, the seller moves to yet another application that is independent of the loan sales application, for example, an email application. The information concerning the loans available for counter offer is communicated to the unsuccessful buyer to provide the opportunity to counter offer. At an act of receiving the buyer's reply 230, the seller receives the buyer's reply. Again, the communication is provided in an application that is independent of the loan sales application.

The process 200 moves to an act of revising the bids 232. Here, the seller returns to the loan sales application and manually updates the bid information to reflect any counter offers. Of course, this requires that the seller switch applications yet again.

SUMMARY OF INVENTION

Therefore, there is a need for apparatus, systems and methods for a loan sales application that includes the full suite of functionality required for an optimized loan sales process. According to various embodiments, the loan sales application illustrated and described herein allows sellers and buyers to operate with precise knowledge of the value of any bid. According to one embodiment, commitments to sell selected mortgages to a buyer are made based on the real-time market value of benchmark prices.

According to one aspect, a non-transitory computer-readable medium includes computer program instructions executable by at least one computer processor to perform a method for a seller to commit to a sale of loan products to selected buyers using an application with a graphical user interface presented in a display. In some embodiments, the method includes receiving, by the application, a plurality of bids offered by prospective buyers for loans previously made to borrowers and offered for sale to the prospective buyers by the seller via the application, each of the respective plurality of bids including a bid having a bid value determined as a current value of a known benchmark adjusted by a set amount that is shared with the seller by the prospective buyer offering the bid, respectively. The method also includes tracking, with the application, a current price of the known benchmark and adjusting the bid value in response to any changes in the current price of the known benchmark, the adjusted bid value being a bid price of record on commitment by the seller to a sale of the loan to a prospective buyer, and further organizing by the seller, with the application, a plurality of pools of loan products within the graphical user interface to establish a plurality of virtual sales transactions, each of the plurality of virtual sale transactions illustrating a sales price for a plurality of loans included in each of the plurality of pools, respectively, each of the respective sale prices illustrating the bid price of record for the plurality of loans included in the pool on the commitment by the seller to the sale of the loans in the pool. According to various embodiments, the seller commits, with the application, to the sale of the plurality of loans included in each of the plurality of pools at the bid price of record, respectively, at a time the commitment is made.

According to another aspect, a non-transitory computer-readable medium includes computer program instructions executable by at least one computer processor to perform a method for committing to a sale of loan products to selected buyers using an application with a graphical user interface presented in a display. In some embodiments, the method includes receiving, with the application, a plurality of bids offered by prospective buyers for loans previously made to borrowers and offered for sale to the prospective buyers via the application. The method also includes establishing a plurality of pools using the application, each of the plurality of pools defined by a buyer selected from the prospective buyers and at least one characteristic common to each of the loan products placed in the respective pool, and further, configuring the graphical user interface to allow a seller to place each of the loan products offered for sale in one of the plurality of pools, respectively. A single user input is received from the seller via the graphical user interface, the single user input committing the sale of the loan products in each of the plurality of pools, respectively, where a commitment to the sale of the loan products in each of the plurality of pools occurs substantially simultaneously.

According to still another aspect, a non-transitory computer-readable medium includes computer program instructions executable by at least one computer processor to perform a method for a seller to receive counter offers for the purchase of loan products being sold by a seller to selected buyers using a software application accessible via a graphical user interface presented in a display. In some embodiments, the method includes receiving, with the software application, a plurality of bids offered by prospective buyers via the software application for loans previously made to borrowers and offered for sale to the prospective buyers by the seller via the software application. The method also includes presenting, with the software application, information in the graphical user interface to uniquely identify each of the loans, each of the prospective buyers and each bid offered by the prospective buyers, and further, where multiple bids are received for a single loan included in the loans made available for sale, presenting with the software application, a graphical display element configured for a selection by the seller In response to the selection of the graphical display element by the seller, a notification to a buyer selected from among the prospective buyers is communicated via the software application, the notification requesting a counter offer.

As used herein, the terms "commit" or "commitment" refers to a binding agreement to sell a group of one or more loans in a specified quantity. For example, one of ordinary skill in the art, in view of the disclosure provided herein, would understand that when employed in the context of a bid-auction sales process a commitment binds the seller of the loans and the selected buyer to a sales transaction consistent with the terms of the buyer's bid. One of ordinary skill in the art, in view of the disclosure herein, will also recognize that the term "virtual commitment" refers to a proposed commitment that is not yet binding but will become a binding agreement to sell a group of one or more loans in a specified quantity should the seller take a subsequent act to notify the buyer of the seller's commitment.

As used herein, the term "pool" refers to a group of one or more loans that are organized together to commit the sale of the loans to a specified buyer. One of ordinary skill in the art, in view of the disclosure provided herein, will recognize that a single buyer may be associated with multiple different pools, for example, where the pools are associated with a set of parameters whose values differ from pool to pool.

As used herein, the terms "loan" or "loan product" refer to a previously agreed to and executed lending of funds by a lender to a borrower. One of ordinary skill in the art, in view of the disclosure provided herein, will recognize that a mortgage with a settlement completed is a loan. One of ordinary skill in the art, in view of the disclosure provided herein, will also recognize that a loan application such as a mortgage application, or a mortgage prior to settlement are not "loans" or "loan products" as the terms are used herein. Further, one of ordinary skill in the art will also recognize that a mortgage backed security or other security offerings are not "loans" or "loan products."

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 7 illustrates a graphical user interface including a loan sales commitment cart in accordance with one embodiment.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 3:
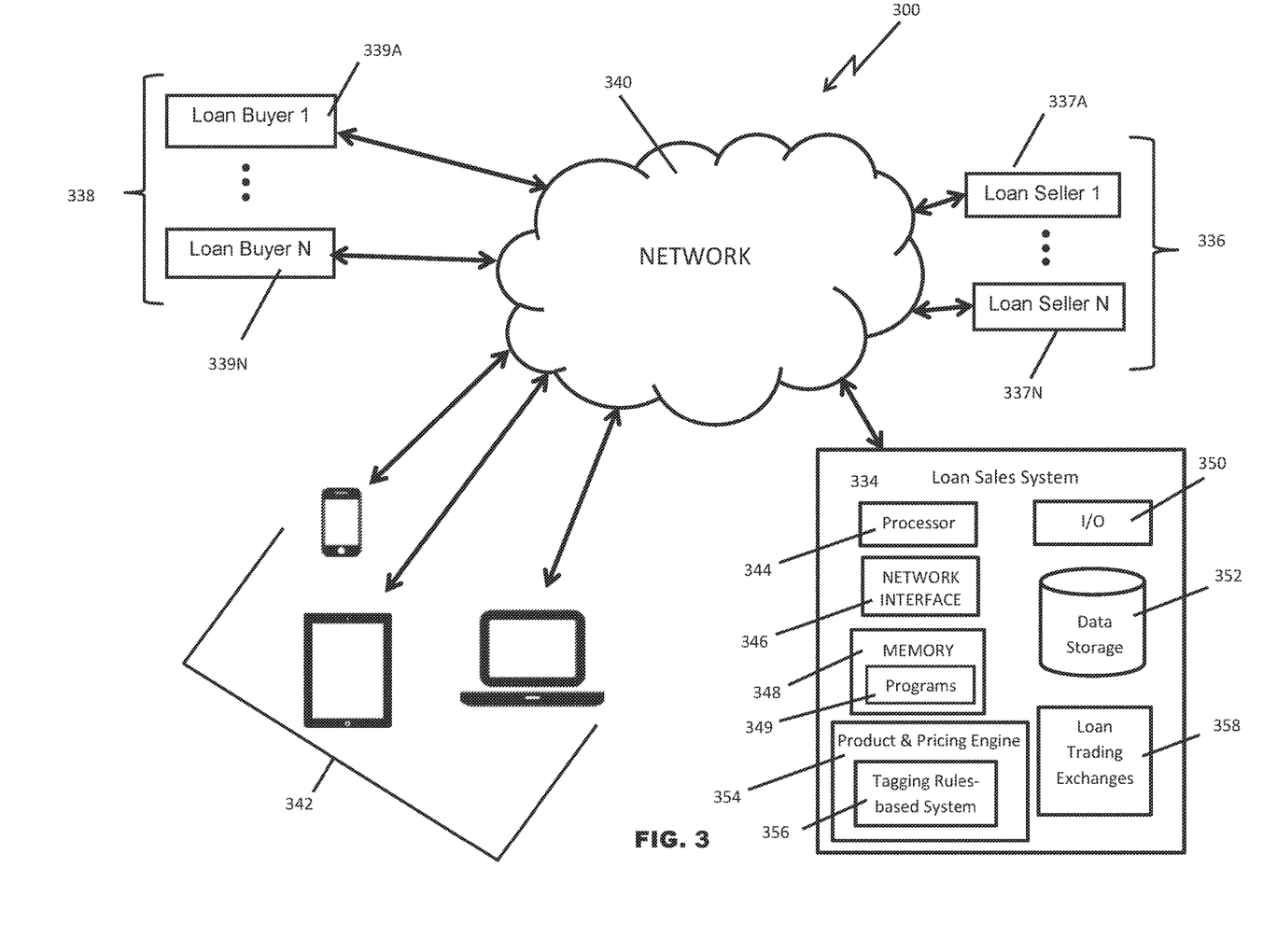
FIG. 3 illustrates a system including a network operating environment for a loan sales application in accordance with one embodiment.

Referring now to FIG. 3, a system 300 for selling loans is illustrated in accordance with various embodiments. According to the illustrated embodiment, the system 300 includes a loan sale system 334, a plurality of loan sellers 336, a plurality of loan buyers 338, a network 340 and a plurality of user devices 342. The plurality of loan sellers 336 includes any of loan seller 1 337A through loan seller N 337N. The plurality of loan buyers 338 includes any of loan buyer 1 339A through loan buyer N 339N. In various embodiments, the system 300 is employed to operate a bid-auction process by a loan seller (any of the loan sellers 337A-337N) for loans offered for sale to buyers included in the plurality of loan buyers 338A-338N as described in greater detail below.

In general, a system administrator or other operator of the loan sales system 334 is responsible for maintaining and operating the system 334 and providing access to the plurality of loan sellers 336 and the plurality of loan buyers 338 via the network 340. For example, the resources included in the loan sales system 334 can be provided as a web application (a SaaS system) employed by the plurality of loan sellers 336 to organize and present their sales offerings to the plurality of prospective buyers 338. One of ordinary skill in the art, in view of the disclosure provided herein, will recognize that the loan sales system 334 includes separate secure accounts accessible to each of the plurality of loan sellers 336, respectively. In addition, one of ordinary skill in the art, in view of the disclosure provided herein, will recognize that the individual buyers 339A-339N selected from the plurality of loan buyers 338 by any one of the loan sellers 337A-337N can vary. For example, some loan buyers may have access to the separate secure bid-auctions offered by a plurality of the sellers 337A-337 N while other buyers 339A-339 N may only have access to bid-auctions offered by a single one of the plurality of loan sellers 336. Further, the system 300 can also operate to provide the services and functions described herein where a loan seller is also a loan buyer for third party loan sales and vice versa.

In various embodiments, the loan sales system 334 provides the interface and tools for organizing a pipeline of loans (for example, mortgages) for sale, contacting buyers to promote the sale, facilitating a review of available loans and bid offers by buyers for the loans, identifying winning bidders and committing to the sales transactions at agreed upon bid prices. In the illustrated embodiment, the loan sales system includes a processor 344, a network interface 346, a memory 348, I/O 350 and data storage 352. The memory 348 includes at least one program 349. Depending on the embodiment, the loan sales system 334 can include one or more of a variety of computing devices such as a general purpose computer such as a PC, a laptop, a tablet computer or other computing device. The resources included in the loan sales system 334 can be hosted on one or more servers accessible to the system operator, the plurality of sellers 336 and the plurality of buyers 338 via the network 340. The network interface 346 is employed for communication between the loan sales system 334 and other elements connected to the network 340 including the plurality of sellers 336, the plurality of buyers 338 and the user devices 342.

The memory 348 can store the programs 349 that when executed by the processor 344 render user interfaces in a display included in the loan sales system 334. The user interface can be employed by a user (for example, the seller 337A-337N) to operate the loan sales system 334 to perform steps to organize the pipeline of loans (for example, mortgages) for sale, contact buyers to promote the sale, facilitate a review of available loans and bid offers by buyers for the loans, identify the winning bidders and commit to the sales transactions at agreed upon bid prices. The user interface can also be rendered for buyers to allow them to receive notifications from sellers regarding the sale of loans and provide bids offered for selected loans.

The I/O 350 can include any of the display in which a graphical user interface (GUI) is presented to the user, a touchscreen controller where, for example, the display is a touchscreen display, or alternatively, a trackpad or mouse used to move a cursor within a GUI. According to further embodiments, the I/O can include an audio system employed with a speech recognition system to allow hands-free interaction with the GUI.

According to some embodiments, the data storage 352 stores information concerning various aspects of the loan sales system 334, for example, the loans being offered for sale, any bids that are received and the actual sales commitments. Depending on the embodiment, the data storage 352 can include any of a relational database, object-oriented database, unstructured database, or other database. Further, the data storage 352 can be included in any aspect of a memory system, such as in RAM, ROM or disc, and may also be separately stored on one or more dedicated data servers included in the loan sales system 334.

According to the illustrated embodiment, the loan sales system also includes a product and pricing engine 354 including a tagging rules-based system 356 and loan trading exchanges 358. In various embodiments, the product and pricing engine 354 is employed by sellers to define/establish the characteristics of the loans offered for sale in the loan trading exchanges 358 where the characteristics can be employed to pool loans in the exchanges 358 with like characteristics and commit each pool to a selected buyer. Further, the tagging rules-based system 356 allows the seller to optimize the process by grouping similar rules together so that they can be applied to loans for a precise but streamlined characterization. For example, the loans can be pooled because they meet the same parameters such as the loan term, interest rate and program-type to name a few.

The loan trading exchanges 358 provide a tool for sellers to organize a pipeline of loans, offer them for sale, receive and evaluate bids, organize the successful bids into virtual pools, make any desired updates to the pools in view of new bids and/or counter offers, and then commit to the sale of the loans. In various embodiments, a graphical user interface rendered in the seller's user device 342 allows the seller to commit to the sale of all loans currently in their pipeline with a single click or another type of act or selection (for example, a touch input) in the graphical user interface.

The components included in the loan sales system 334 can be coupled by one or more communication buses or signal lines. The communication buses can be used for the communication of instructions/commands and data between the illustrated components and between the illustrated components and other components included in the system 334 depending on the embodiment.

In general, the network 340 can include either or both of local-area networks (LANs), wide area networks (WANs), wireless communication, wired communication and may include the Internet. According to a further embodiment, the network 340 provides access to one or more remote devices, servers, application resource management and/or data storage systems. For example, the network 340 can allow communication between any of the loan sales system 334 and the plurality of user devices 342. In general, the system 300 provides for communication of the illustrated components with one another and/or with any of the other resources and devices coupled to the network 340. Communication can occur using any of Wi-Fi networks, Bluetooth communication, cellular networks, satellite communication, and peer-to-peer networks available either alone or in combination with one another via the network 340. Depending on the embodiment, the network 340 may be any type and/or form of network known to those of ordinary skill in the art capable of supporting the operations described herein. Thus, other communication protocols and topologies can also be implemented in accordance with various embodiments.

The plurality of user devices 342 can include any type of computing device suitable for communicating with the loan sales system 334 via the network 340. Accordingly, the plurality of user devices of can include one or more of a variety of computing devices such as a general purpose computer such as a PC, a laptop, a tablet computer or other computing device. The user devices 342 are representative of the devices employed to access the resources hosted by the loan sales system 334 by system operators, developers, loan sellers 336 and loan buyers 338.

Figure 4:
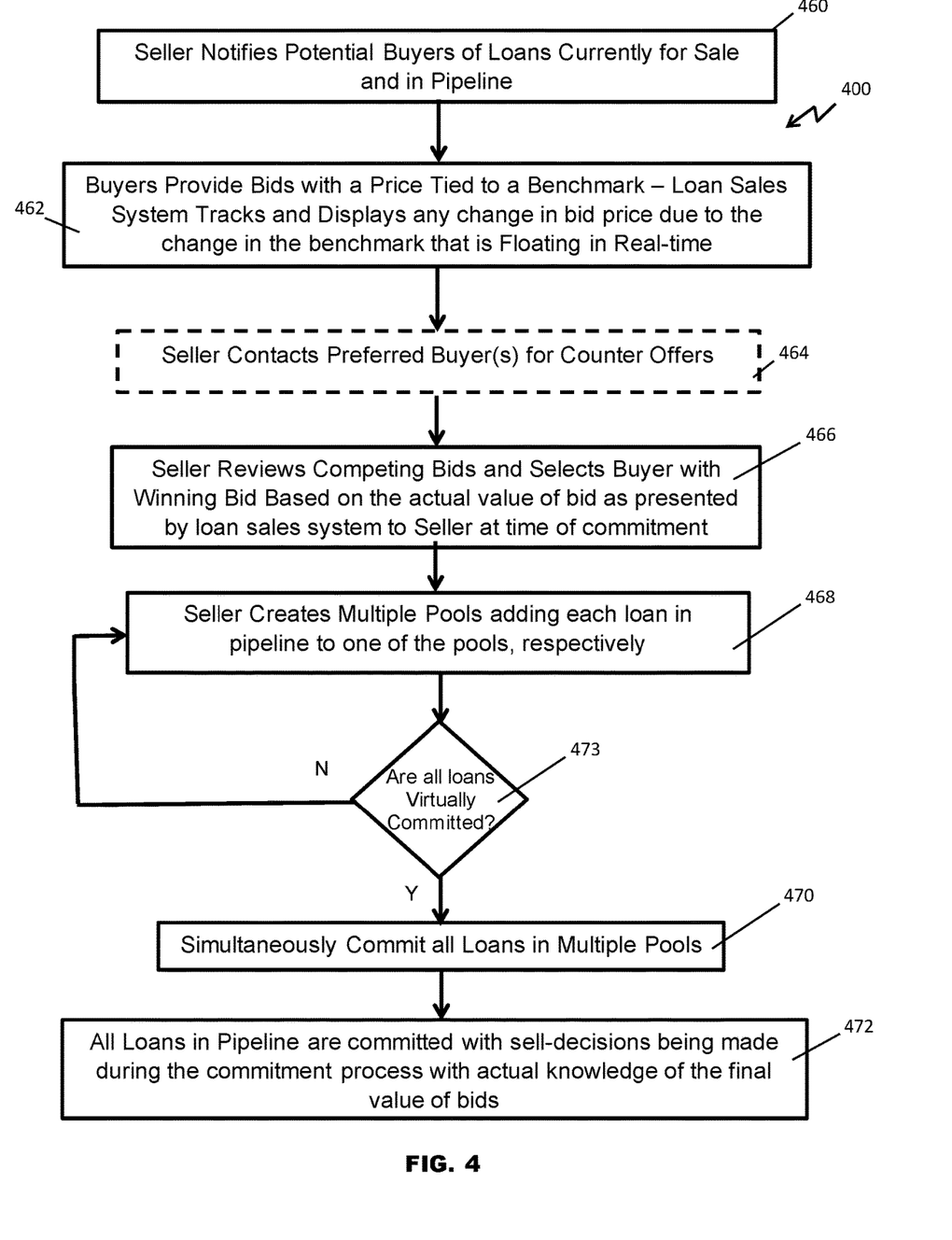
FIG. 4 illustrates a flow diagram of a process for selling loans in accordance with one embodiment.

Referring now to FIG. 4, a flow diagram of a process 400 employed for loan sales is illustrated in accordance with one embodiment. According to some embodiments, the loan sales include the sale of mortgages in the secondary market. The process 400 can be used with the loan sales system 334 to organize loans included in a pipeline of loans into different pools where the seller can commit to the sale of all the pools of loans with a single action. The result is a process that can save sellers many hours each day and increase the accuracy of settlement by automating manual workflows. Further, the seller can organize loans in the pools based on the identity of the buyer and product-type parameters.

In various embodiments, the process 400 includes actions and decision points. According to the illustrated embodiments, the actions include an act of notifying potential buyers 460, an act of receiving bids 462, an act of requesting counter offers 464, an act of reviewing competing bids 466, an act of creating multiple pools of loans 468, an act of committing the loans 470, and an associated act of completing the commitments with actual knowledge of bid values 472. According to the illustrated embodiment, the decision point included in the process 400 is an act of determining whether all loans are virtually committed 473.

According to the illustrated embodiment, the process 400 starts at the act of notifying potential buyers 460. Here, the seller employs the loan sales system resources to establish the loan trading exchange for a group of loans in the seller's pipeline and then notify loan buyers. According to one embodiment, the pipeline is the group of loans that are to be sold that day. The loan trading exchange 358 allows sellers to include any quantity (for example, hundreds) of loans in the pipelines. The only limitation is the volume of mortgages owned by the seller. In practice, the seller's can employ the system 300 to sell a first pipeline on a first day and a second pipeline the following day. Depending on the embodiment, the process 400 can include a separate act for creating the pipeline followed by an act of notifying buyers.

The process moves to the act of receiving bids 462. Here, interested buyers provide their bids on the loan trading exchange 358 for that seller via the network 340. For example, in response to a request by a seller, an operator of the loan sale system 334 can invite buyers to access the seller's loan trading exchange 358. In reply to the invite, the buyer can establish an account login to allow the buyer to securely access a web application provided by the loan sales system 334 and rendered in a display of the user device 342 in possession of the buyer. The loan sales system 334 can allow a buyer to access the respective loan trading exchanges of one or more different sellers, and to do so securely, such that information included in the sellers' separate loan trading exchanges is not accessible to the other sellers with access to the system 334.

According to various embodiments, bids are provided based on a difference (or "delta") that is offered by the buyer between the value of the bid and a known benchmark. In the secondary market for mortgage loans, these benchmarks can include the price of a uniform mortgage-backed security offered by Freddie Mac or Fannie Mae or the price of a mortgage-backed security offered by Ginnie Mae. Unlike prior systems, the loan sales system 334 operates as the system of record for bid pricing. That is, the bids offered by the buyers for loans being sold on the load trading exchanges 358 provide certainty to both the seller and the buyer that the bid price is known. In various embodiments, the preceding is facilitated by a feed of information to the loan sale system 334 concerning the current market price of the benchmark on a real-time or substantially real-time basis. This approach provides previously unrealized advantages. First, the market-price data feed allows the loan sales systems 334 to maintain an up-to-date value for each of the various bids. This information is available to both the buyers and sellers. For the seller, this assures that any bid analysis they perform during the commitment process reflects the actual value of the bid. Second, because the loan sales system 334 is the system of record, buyers and sellers know the actual sale price immediately when the commitment is made.

The process 400 can optionally include a solicitation of counter offers by the seller, for example, as illustrated at the act of requesting counter offers 464. Here, the loan sales system 334 provides an operation integral to the web application for the seller to contact buyers on the loan trading exchange 358 with up-to-date information on existing top bids by other buyers. This provides the buyer with an opportunity to provide a matching or higher bid to secure the purchase of the loan. Here too, the software application provided hosted by the loan sales system 334 delivers this process within the application itself. That is, neither the buyer nor the seller needs access to another software application (for example, an email application) or communication technology (for example, voice phone) to participate in the counter offer process.

Following the act of receiving bids 462 or the act of contacting buyers for counter offers 464, where included, the process moves to the act of reviewing bids 466. Here, the seller employs the software application to review the various bids being received for all the loans in their pipeline. The review is aided because the loan sales system 334 provides real-time bid values to the seller.

With the real-time bid values known, the seller creates the pools of loans at the act of creating multiple pools of loans 468. Each pool is identified with a pool ID number. Each pool also includes a single buyer for the loans in the pool. Each pool is also established with a known set of additional characteristics for all loans to be placed in the pool. Generally, these characteristics establish a consistent set of values for different parameters for loans to qualify for the pool. For example, the parameters can include the range of the note rate for qualifying loans, the specific agency that is servicing the loan, the specific loan product, the classification of the specific loan product and the amount of unpaid principal for the loan. As one example, the note rate may be from 3.5-4.25%, the servicing agency may be the seller (should they choose for some loans) or a third party, the loan product may be classified as a 30 year fixed rate conforming mortgage as one example, and the remaining unpaid principal may include a range, for example, $150,000-$275,000.

The loan sales system 334 includes the tools presented in the graphical user interface of the application to enable sellers to create virtual pools of loans for commitment. That is, the seller can create pools and move loans into the pools while continually reviewing loans in the pipeline, reviewing current bid values and reviewing the parameters associated with each of the various pools. The seller can complete all the preceding for all loans in the pipeline and do so before moving from a virtual commitment known only to the seller and an actual commitment that notifies the successful buyer(s) of the pool and creates a binding agreement for the sale of the loans at the respective bid prices. As is explained in greater detail below, the process includes the act of determining whether all loans are virtually committed 473. If all the loans are not yet virtually committed, the process continues to return to the act of creating multiple pools of loans 468, until all the loans are found to be virtually committed.

When the act of determining whether all loans are virtually committed 473 finds that all the loans in the pipeline are virtually committed to a pool, the seller has a complete picture of the value that is received from the bids for all loans in the pipeline. With this information, the process moves to the act of committing all loans in the pipeline 470. This occurs with all the loans in the pipeline now distributed in the various pools. According to some embodiments, the process requires only a single input by the seller such that the commitments for all the loans for sale in the pipeline occurs simultaneously.

The process 400 includes an act 472 to summarize that the embodiments described herein provide the seller and buyer with a sales transaction that is committed with a mark-to-market value for each pool and each loan in the seller's pipeline. That is, the bid price for each sales transaction is valued based on the most recent market price of the relevant benchmark. As described above, the capability of the loan sales system to provide the most recent market price and be employed as the system of record allows the seller to make these commitments with actual knowledge of the sales value of each loan, each pool and the entire pipeline. The embodiments that employ a "one-click commit" provide the added benefit for the seller to capture a single point in time to establish the most recent market price and apply that across all loans in the pipeline. Thus, according to various embodiments, a "one click commitment" available to the seller via a display object rendered in a user interface allows the seller to commit to the sale of all uncommitted loans currently in the seller's pipeline at the market price established at a single point in time. Further, the market price can be established for a plurality of different benchmarks that may be referenced in one or more different bids, respectively.

Figure 5:
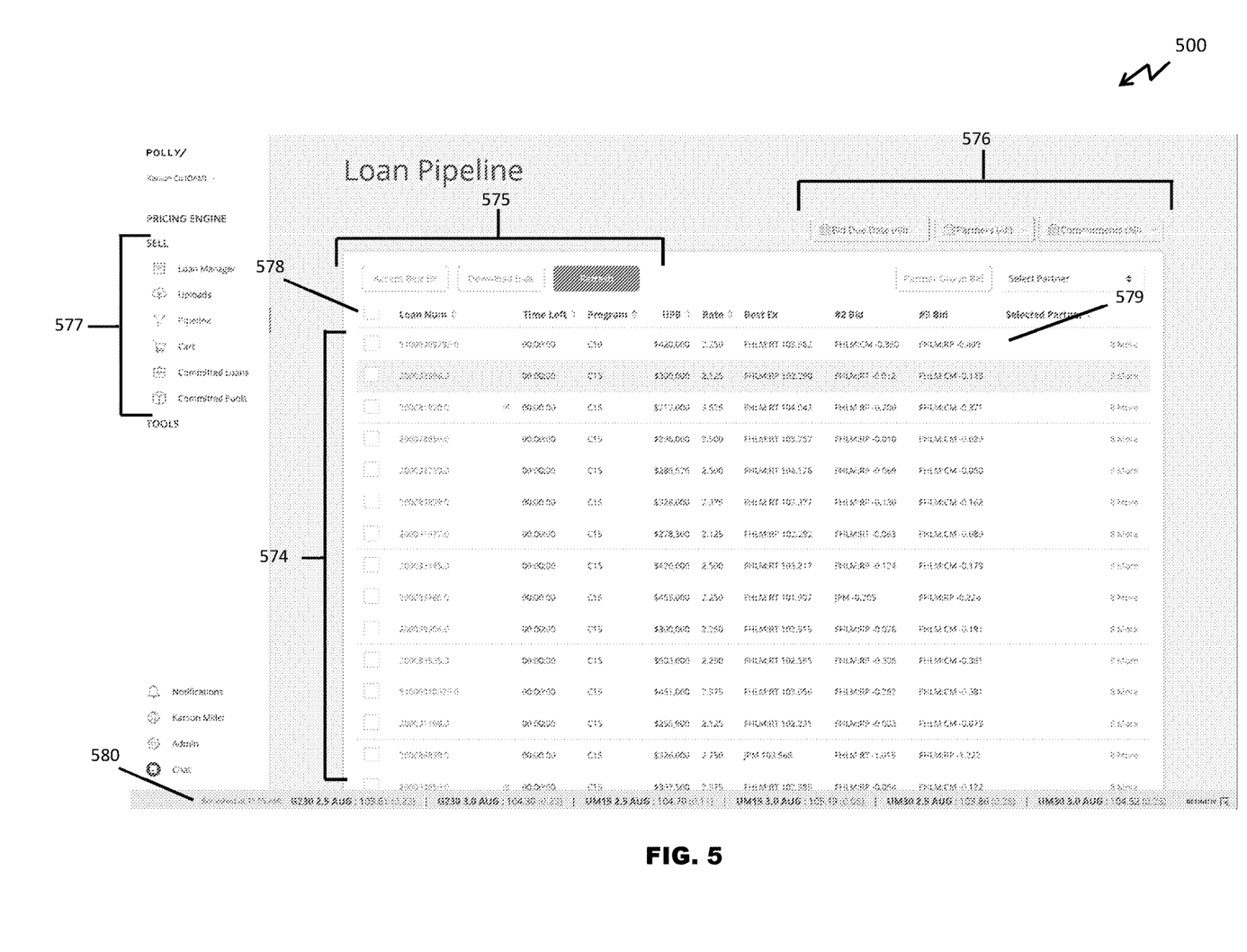
FIG. 5 illustrates a graphical user interface including a loan sales pipeline in accordance with one embodiment.
Figure 6:
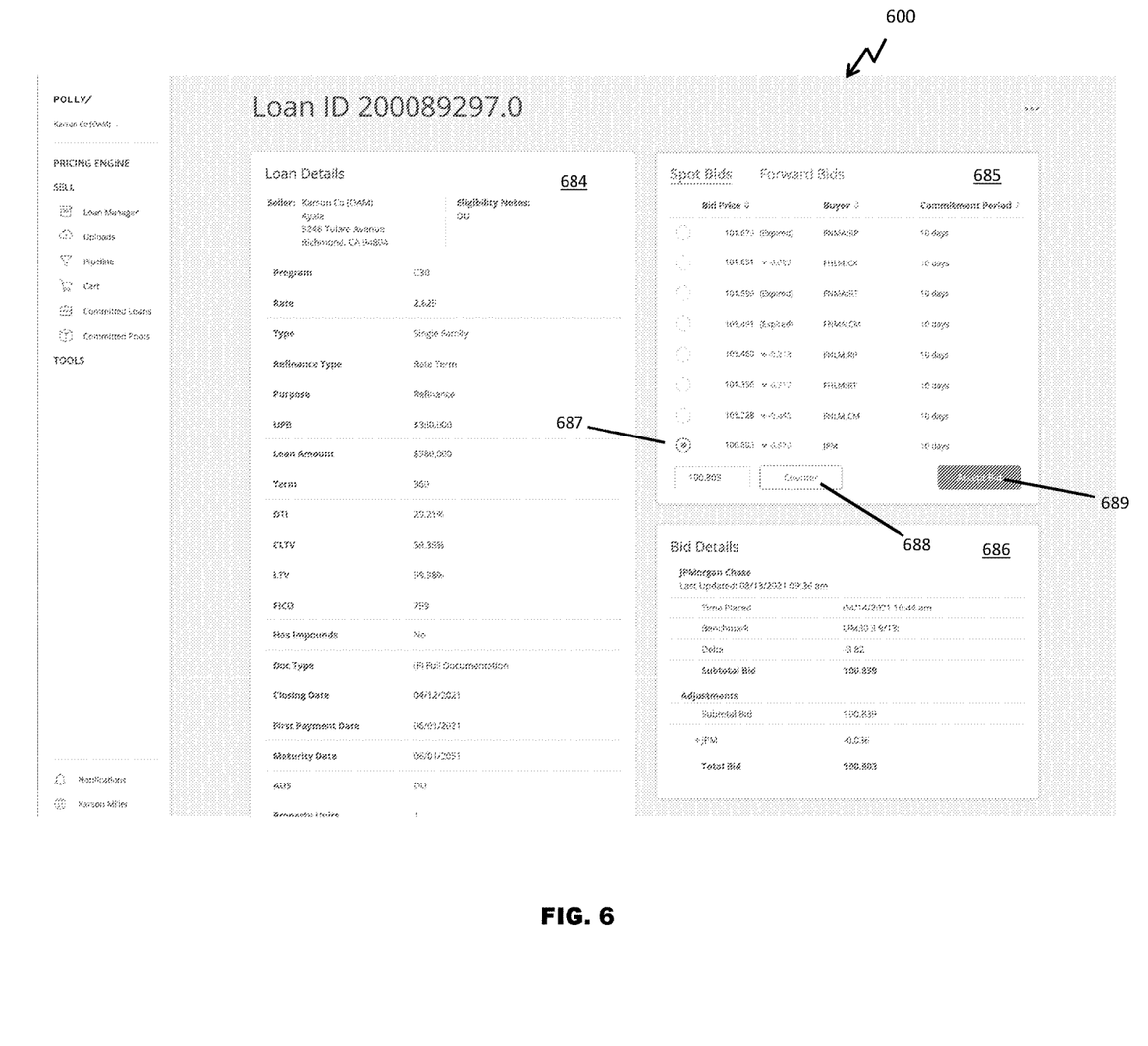
FIG. 6 illustrates a graphical user interface including bid details in accordance with one embodiment.

Referring now to FIGS. 5-7, user interfaces employed by one or more sellers to sell loans are illustrated in accordance with various embodiments. According to various embodiments, the user can employ the computing resources included in the system 334 to create a pipeline of loans for sale, solicit bids, organize loans and associated bids in the pipeline into pools of loans and then simultaneously commit to sales transactions for all loans in the pipeline at mark-to-market prices. For example, the user interfaces can be generated by a software application operating as a part of the loan sales system 334. The software application can include one or more programs (e.g., programs 349 of FIG. 3) stored in the memory 348 that when executed by the processor 344 render the user interface in a display included in a respective user device 342 of the seller. The embodiments described with reference to FIGS. 5-7 illustrate a series of display objects of a graphical user interface presented in the display to allow a seller to interact with the loan sales system in a bid-auction sale of mortgages. In various embodiments, the user employs the loan sales system to evaluate competing bids, solicit counter offers and commit to sales that maximize value for the seller.

Referring to FIG. 5, a user interface 500 is illustrated in accordance with various embodiments. In the illustrated embodiment, the user interface 500 is rendered in a GUI to display and provide access to the user for the plurality of loans in a pipeline. The user interface 500 includes a listing of individual loans 574, a first set of display objects 575, a second set of display objects 576, loan sales menu 577 and a benchmark price ticker 580. The listing of individual loans 574 includes a header 578 that identifies the type of information presented in each column and provides the user an opportunity to apply actions globally across all loans currently in the pipeline. A first loan 579 in the plurality of listed loans 574 is identified in FIG. 5 for the purpose of describing the features included in each listing.

Beginning at the leftmost end, the header 578 includes a select all "check-box", a loan identification number column header, a time left column header, a program header, an amount of unpaid principal balance column header, an interest rate column header, a best bid column header, a #2 bid column header, a #3 bid column header and a selected partner column header. Using the first loan 579 as an example, each loan number uniquely identifies the loan relative to any other loan in the seller's system. Further, the loan number is rendered in the user interface 500 as an active link. For example, in response to a selection of the loan number, the application presents the user with further detailed information concerning the selected loan as described in greater detail with reference to FIG. 6. The time left column refers to an amount of time remaining before bids close for the listed loan. The loan sales system 334 can permit the seller to customize the amount of time available for bidding on a selected loan or loans. The program column refers to the general category of the loan, for example, the first loan 579 is a conforming 10 year mortgage. The unpaid principal balance refers to an amount of the loan's principal that remains unpaid at the time of sale, $420,000 for the first loan 579. The rate column refers to the interest rate on the mortgage, 2.25% for the first loan 579.

The "Best Ex" column refers to the highest current bid and includes an identity of the buyer and the bid price offered by the buyer based on the current value of the relevant benchmark as of the last refresh. For the first loan 579, the buyer's identity is abbreviated as "FHLM:RT" and the current value of the bid is $103.562 per one hundred dollars in unpaid principal. Each of the #2 bid column and the #3 bid column also include an abbreviated buyer-identity. However, in each of the #2 bid column and the #3 bid column, the difference between the bidders current bid and the best bid is presented rather than the actual unit-price of the bid. For example, for the first loan 579, the #2 bid is −0.380 less than the best bid (or $103.182 per one hundred dollars in unpaid principal). Similarly, the #3 bid for the first loan 579 is −0.409 less than the best bid.

The selected partner column allows the seller to review a bid provided by a buyer selected by the seller regardless of whether the bid is one of the top three bids. In addition, the record for each of the listed loans includes an active link located on the far right of the listing where the link provides access to information concerning any additional bids made on for the selected loan.

The first set of display objects 575 are generally directed to operations to allow the user to maintain an up-to-date record of the bids and also to accept bids. According to the illustrated embodiment, the first set of display objects 575 are rendered as buttons within the GUI to permit the user to select the display object to initiate the associated action. These display objects 575 include an "Accept Best Ex" display object, a "Download Bids" display object and a "Refresh" display object. Each of the first set of display objects 575 generates the associated action for the loans that are selected ("checked") from among all loans in the listing of individual loans 574. For example, when the "Accept Best Ex" display object is selected by the user, the highest bid available for any of the selected loans is automatically accepted. For example, if the first loan 579 is currently selected, a selection of "Accept Best Ex" results in a bid of $103.562 per hundred dollars of unpaid principal balance ("UPB") being accepted for the loan with the loan number ending in 795.0. Similarly, when the "Download Bids" display element is selected, bids received from first-time bidders for a loan are added along with any revised bids received from the existing bidders for the loan. Here too, the preceding action only applies to the selected loans unless the global selection available in the header for the listing of individual loans 574 is selected. The "Refresh" display object is employed by the user to update the bid prices to bring them current with the most recent market price for all selected loans in the pipeline.

The second set of display objects 576 are generally directed to global operations to allow the user to set the display of selected groups of loans in the pipeline within the user interface 500. According to the illustrated embodiment, the second set of display objects 576 are rendered as buttons within the GUI to permit the user to select the display object to initiate the associated action and update the display of the loan pipeline. These display objects 576 include a "Bid Due Date" display object, a "Partners" display object and a "Commitments" display object.

Each of the second set of display objects 576 provides a pull-down menu to allow the user to adjust (or "filter") the display of the loans in the loan pipeline. For example, the "Bid Due Date" display object is set to a selection of "(All)" in FIG. 5. In this example, all loans in the pipeline are include for display in the user interface 500 regardless of the bid due date. Other options available via the "Bid Due Date" display object can include a menu item for display only of loans with bid due dates that are prior to the current date, or alternatively, a menu item for display only of loans that are due on the current date or later in time. The functionality provided by the filter permits the seller to limit the display to those loans currently out for bids rather than all loans in the seller's system.

Similarly, in FIG. 5, the "Partners" display object is set to "(All)". In this example, all loans in the pipeline are include for display in the user interface 500 regardless of the partner. Other options available via the "Partners" display object can include a menu item for display only of loans with a specified category of partner, for example, loans with buyers who are banks.

In FIG. 5, the "Commitments" display object is also set to "(All)". This filter allows the seller to filter bids based on the execution style of the loan, for example, mandatory execution by the buyer versus a best effort for execution by the buyer. With the "Commitments" display set to "(All)" as illustrated in FIG. 5, all loans in the pipeline are include for display in the user interface 500 regardless of the execution style of the loan.

The loan sales menu 577 is available as a selection in a higher-level menu that allows the seller to employ the software application to navigate within the GUI to any of the pricing engine, the sales interface and the tools interface. For example, a selection of the pricing engine menu selection can provide the user with a submenu that provides access to the suite of tools provided within the application to employ the tagging rules-based system 356 or other functionality available via the product and pricing engine 354.

The benchmark price ticker 580 includes the market price of the benchmarks that may be used by buyers when placing bids. That is, the bid-auction process typically includes bids received from buyers where the bid price is established relative to a benchmark publicly traded security, for example, those offered by Fannie Mae, Freddie Mac and Ginnie Mae. The refresh option described above allows the seller to maintain a real-time bid price for all the bids in the system. The benchmark price ticker 580 displays the current benchmark prices at each refresh. The benchmark price ticker 580 also displays a "Refreshed at" time to allow the seller to stay current as needed when reviewing loans in the pipeline throughout the commitment process.

Referring now to FIG. 6, a user interface 600 is illustrated in accordance with various embodiments. In the illustrated embodiment, the user interface 600 is rendered in a GUI to display and provide access to details concerning a specific loan selected by the user from among the plurality of loans in a pipeline. For example, the user interface 600 can be reached following a selection of the loan with the Loan ID 200089297.0 which was included a display of all loans in the pipeline. The user interface 600 includes a loan details section 684, a bid list section 685 and a bid details section 686.

Referring to the loan details section 684, the information concerning the selected loan is organized such that bidders have facts to accurately assess the risk and corresponding value of the loan based on the buyer's standards. In the illustrated embodiment, this includes among the various information an identification of the seller, the type of mortgage program (for example, conforming 30 year fixed), the interest rate of the mortgage, the type of property (single family, multi-family, condo, etc.), the purpose of the mortgage (for example, purchase or refinance), the UPB, the original amount of the loan, the term of the loan, various determinations related to the loan to value ("LTV") of the mortgage, the credit score of the borrower, the type of documentation provided in the mortgage application, the closing date, the first payment date and the maturity date.

The bid list section 685 provides details concerning each of the bids made for the selected loan (Loan ID 200089297.0 in this example). These include the bid price and status, for example, whether the bid is active or expired, and if active, a difference between each bid and the highest bid received to-date. The identity of the buyer and the commitment period are also provided for each of the bids.

The bid list section 685 also allows the user to take further actions and review more detailed information with the selection of any one of the bids listed in that section. According to the illustrated embodiment, a display element in the form of a "radio button" is available with each of the listed bids, here, the radio button is selected for a selected bid 687. The bid list section 685 also includes a set of additional information fields and display elements to allow the user to take further actions on the selected bid 687. For example, the bid price offered with the selected bid is highlighted as a separate display element or "field".

In addition, the bid list section 685 also includes a first display element 688 and a second display element 689 that are operable with any one of the listed bids selected. For example, the first display element 688 provides the seller with an opportunity to solicit a counter offer from the buyer of the selected bid, here, JP Morgan Chase (or "JPM"). As described above with reference to FIG. 4, the application provides integral functionality to allow the seller to contact buyers on the loan trading exchange 358 with up-to-date information concerning existing top bids by other buyers. Here, a selection of the first display element 688 generates an in-application notification to the buyer informing them of the opportunity to counter offer. This provides the buyer with an opportunity to provide a matching or higher bid to secure the purchase of the loan all within the application provided by the loan sales system 334 to both buyer and seller. Thus, neither the buyer nor the seller needs access to another software application (for example, an email application) or communication technology (for example, voice phone) to participate in the counter offer process. Further, the process is streamlined with the availability of a single display element, the first display element 688, that is selected by the seller to initiate the counter offer related communications.

Regardless of whether a counter offer is solicited, the second display element 689 is employed to accept a bid included with the bid currently selected in the bid list section 685 of the user interface 600. For example, the seller may select the highest available bid in the amount of $101.651/ hundred of UPB with the selection of the associated radio button and a subsequent selection of the second display element 689.

The seller can also navigate in the bid list section 685 between a display of spot bids and a display of forward bids. Spot bids are bids that if awarded create a new commitment with the buyer offering the bid. Forward bids are bids that if awarded get allocated to an already existing commitment with the buyer offering the bid. A bid fits an existing commitment, for example, where the buyer matches the buyer of the existing commitment and the characteristics of the loan also fit the existing commitment. These characteristics or "parameters" are described above and can, for example, include items such as the loan term, interest rate and program-type.

The bid details section 686 provides the details for the bid currently selected in the bid list section 685 of the display 600. Here, the bid offered by JPM is currently selected in the bid list section 685 and the bid details section 686 provides detailed information concerning that bid. The bid details can include an identification of the buyer offering the bid, a time when the bid was originally placed, a time when a value of the bid was last updated to reflect the market price of the associated benchmark, an identification of the benchmark upon which the bid is based and the delta (or difference) between a current market value of the benchmark and the bid price. Here, for example, the selected bid is based on a uniform mortgage-backed security of 30-year mortgages having a coupon rate of 3.0% and a settlement date of September 13$^{th}$.

The bid details section 686 also reflects any adjustment that the seller is making to the as-offered bid price to reflect a true value of the bid to the seller. For example, the selected bid is offered at a face value of the market price of the benchmark less $3.82/unit. The preceding value is reflected in the listed amount of the "Subtotal Bid" displayed in the bid details section 686. However, the application allows the seller to adjust the amount of the subtotal bid to reflect fees that can be specific to the buyer. For example, fees associated with the seller's cash bias, point bias or other adjustments that lower the actual value of a bid. As another example, an approach or standard practices of a particular buyer may create an added administrative burden during a sales transaction that adds real costs for the seller. The seller can employ the adjustments to account for these biases and costs to provide an apples-to-apples comparison of the values of competing bids. In FIG. 6, the seller includes an adjustment of –0.036/unit for the selected bid.

Referring now to FIG. 7, a user interface 700 is illustrated in accordance with various embodiments. In the illustrated embodiment, the user interface 700 is rendered in a GUI to create, display and modify pools of loans. The user interface 700 also provides the seller with an ability to commit to the sale of loans at an offered bid price, and to do so simultaneously, for a plurality of pools.

According to the illustrated embodiment, the user interface 700 includes a plurality of virtual pools 790 and a plurality of forward pools 791. The plurality of virtual pools 790 are created by the seller who then adds selected loans to the pools based on current bids, a selected buyer and a selection of characteristics for loans to be included in the pool. This selection and organization is performed prior to committing the pools for purchase by the buyer at the bid price. The forward pools 791 are already established pools which may include loans that are previously committed to by the seller after the forward pool is created. According to the illustrated embodiment, a virtual pool 792 is identified for purpose of explanation. The virtual pool 792 includes both pool information 793 and loan information 794. A forward pool 795 is also identified for purpose of explanation. The forward pool 795 also includes both pool information 796 and loan information 797. The user interface also includes a "Commit Pools" display object 798. According to various embodiments, a selection of the "Commit Pools" display object 798 results in all of the loans in the plurality of virtual pools 790 being committed.

The pool information 793 for the virtual pools and the pool information 796 for the forward pools can uniquely identify the pool, identify one or more loan details, corresponding characteristics and values of the characteristics required for inclusion in the pool. In general, each pool is restricted to a single identified buyer. In addition, the characteristics for inclusion in the pool can include one or more of the characteristics included in the loan details section 684 illustrated and described with reference to FIG. 6. These characteristics or "parameters" can, for example, include items such as the loan term, interest rate and program-type. In the illustrated example, the virtual pool 792 is identified with a pool identifier of Pool 2215, includes identifying information of the buyer, JPMorgan Chase, and a range of interest rates for qualifying loans, 2.5-2.75%. The forward pool 795 also includes a pool identifier of Pool 1203, identifying information of the buyer, Fannie Mae, an identification of the qualifying program type, 30-Year Fixed Rate, and a range of interest rates for qualifying loans, 3.375-3.875%. Here, the forward pool 795 also includes an identification of a loan servicing entity CMC Lending. Any loan must include the immediately preceding set of characteristics to qualify for the forward pool 795 including the fact that the buyer is Fannie Mae and the loan servicer is CMC Lending.

The loan information 794 for loans included in a virtual pool and the loan information 797 for loans included in a forward pool include a unique identifier for each loan and details concerning the top bid for each loan. For example, the virtual pool 792 includes three loans that meet the qualifications for the virtual pool 792. For example, a first loan ID ending in 757.0 has a bid price of $103.485/unit of UPB, an UPB of $510,000, is a conforming 30 year fixed rate mortgage (product C30), and has a note rate of 2.75%. Similarly, the forward pool 795 includes a single loan with a loan ID ending in 271, with a bid price of $101.344/unit of UPB, an UPB of $413,000, is a conforming 30 year fixed rate mortgage (product C30), and has a note rate of 3.75%.

A maximum UPB is also established for each forward pool when the forward pool is created. For example, the forward pool 795 is established with a maximum amount of unpaid principle of $7,600,000. Uncommitted loans from the pipeline including those in the virtual pools 790 will not be added to the forward pool 795 if they will increase the aggregate amount of UPB of all loans in the pool 795 above the maximum of $7,600,000.

Each of the loans in the virtual pool 792 also includes a display object labeled "Move" on the far right of the loan information. Selection of the "Move" display object allows the seller to move the listed loan between virtual pools, for example, the seller can move the loan from a first virtual pool to a second virtual pool if the loan meets the qualifications of the second virtual pool. That is, if the loan has the same buyer and the qualifying characteristics required for entry into the second virtual pool.

The ability to review virtual pools 790 with loans that are not yet committed along with the forward pools 791 together in the user interface 700 can greatly improve the efficiency of the seller's loan commitment process. For example, a seller can quickly compare the qualifications of loans in a virtual pool, with the qualifications of a forward pool when the two pools are displayed together in the user interface 700. The review can include an assessment of the remaining UPB available in the forward pool 795 and the total UPB in the virtual pool 792. A seller can commit all loans in the virtual pool 792 to an existing forward pool 795 if the maximum UPB of the forward pool 795 is not exceeded with the addition of all loans in the virtual pool 792 and the characteristics of the loans in the virtual pool 792 match the characteristics of the loans in the forward pool 795. That is, the loans qualify for the forward pool. Alternatively, where the maximum UPB of the forward pool 795 is exceeded with the addition of all loans in the virtual pool 792, the seller can commitment fewer than all the loans in the virtual pool 792 to the forward pool 795. According to one embodiment, the seller employs the tools available in the user interface 700 to create a new virtual pool with a subset of loans from the existing virtual pool that are suitable for the destination forward pool 795. The loans in the new pool will then be committed to the forward pool 795 when the seller initiates the commitments, for example, with the selection of the "Commit Pools" display object 798.

As described above, the loans sales system 334 provides sellers with a great improvement in efficiency because it includes functionality for a single seller input in the GUI to initiate a commitment of all uncommitted loans in the seller's pipeline. For example, with reference to FIG. 7, a selection of the "Commit Pools" display object 798 acts to commit all loans in the plurality of virtual pools 790 to the buyer of the pool. According to various embodiments, the full set of commitments initiated with a selection of the "Commit Pools" display object 798 occur simultaneously or substantially simultaneously. These virtual pools are then listed and displayed among the plurality of forward pools 791.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. Organizing bids in virtual electronic pools using current mark-to-market prices, the simultaneous "one-touch" commitment to sales transactions of multiple pools of loans, and a counter offer process integral to a single software application provide three such examples.

Each computer program within the scope of the claims below may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors.

Any step or act disclosed herein as being performed, or capable of being performed, by a computer or other machine, may be performed automatically by a computer or other machine, whether explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

While the above description and associated figures are described in the context of the sale of mortgages, the approaches described herein can also be employed in the sale of other types of loans or loan products. Further, the approaches described herein can be employed in the sale of securities including mortgage-backed securities.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer implemented method for a seller to commit to a sale of loan products to selected buyers using an application with a graphical user interface presented in a display, the method comprising:
   receiving, with the application, a plurality of bids offered by prospective buyers for loans previously made to borrowers and offered for sale by the seller to the prospective buyers with the application;
   receiving, with the application, a market-price data feed including market prices of a plurality of benchmarks; and
   presenting, with the application, for display together in a single graphical user interface each of:
      a plurality of pools established by the seller within the single graphical user interface, each of the plurality of pools associated with a buyer who submitted a bid for each of the loan products included in the respective pool, the single graphical user interface configured for the seller to place each of the loan products offered for sale in one of the plurality of pools within the single graphical user interface, respectively, to establish a virtual commitment for each of the respective loan products, the virtual commitment having a bid price of record for a sales transaction not yet committed to by the seller, the bid price of record based, at least in part, on a current value of a selected one of the plurality of benchmarks, respectively; and
      a first graphical display element configured to, in response to a single selection of the first graphical display element by the seller:
         automatically commit to the sale of each of a plurality of loan products included in each of the plurality of pools together at the bid price of record, respectively, to create a binding agreement between the seller and the prospective buyer for the respective sale at the bid price of record.

2. The computer implemented method of claim 1, further comprising, in response to the single selection of the first graphical display element by the seller:
   automatically provide for each of the plurality of loan products included in each of the plurality of pools, with the application, a notification of the sale to the prospective buyer who provided a successful bid for the respective loan product, the notification including the bid price of record, the bid price of record reflecting the market price of the respective benchmark on which a value of the successful bid is determined at a time when the binding agreement is established, respectively.

3. The computer implemented method of claim 1, further comprising:
   presenting, with the application, for display in the single graphical user interface a second graphical display element configured to, in response to a single selection of the second graphical display element by the seller, initiate the receipt of the market prices and an automatic adjustment of a bid value of each of the plurality of bids to reflect an updated price of a known benchmark included in the plurality of benchmarks on which the bid value is determined, respectively, an adjusted value of each respective bid value being the bid price of record, the updated price reflecting any change in price of the respective known benchmark occurring in a period since an immediately preceding refresh of the market prices.

4. The computer implemented method of claim 1, wherein the act of receiving the market-price data feed includes receiving a current value of a uniform mortgage backed security.

5. The computer implemented method of claim 1, further comprising employing at least a defined note-rate range for all loan products included in the respective pool as a common qualifying characteristic for the loan products.

6. The computer implemented method of claim 1, further comprising:
   rendering both a plurality of virtual pools and a plurality of committed pools together for display in the single graphical user interface; and
   moving by the seller, with the application, loan products within the virtual pools prior to the single selection of the first graphical display element by the seller.

7. The computer implemented method of claim 6, further comprising organizing a subset of loan products together within a first virtual pool, wherein the buyer offered a top bid from among all bids received for each of the loan products included in the subset of loan products, respectively.

8. The computer implemented method of claim 7, wherein the subset of loan products is a first subset of loan products, wherein the buyer is a first buyer uniquely identified among all the prospective buyers and wherein the method further comprises organizing a second subset of loan products together within a second virtual pool,
wherein the second virtual pool includes a second buyer uniquely identified among all the prospective buyers, and
wherein the second buyer offered a top bid from among all bids received for each of the loan products included in the second subset of loan products, respectively.

9. The computer implemented method of claim 8, wherein the first buyer and the second buyer are the same buyer, and wherein the method comprises establishing by the seller, with the application, the first virtual pool and the second virtual pool as different pools based on values of parameters used to establish qualifications for the first subset of loan products and the second subset of loan products, respectively, a value of one or more parameters for the first subset of loan products different than a value of the same one or parameters for the second subset of loan products.

10. The computer implemented method of claim 6, further comprising placing all loan products included in at least one of the virtual pools in a selected one of the committed pools in response to the single selection of the first graphical display element by the seller.

11. The computer implemented method of claim 10, further comprising:
establishing by the seller, with the application, a pipeline including all the loan products offered for sale to the prospective buyers in a fixed period of time;
placing all loan products offered for sale in one of the plurality of virtual pools, respectively; and
moving all loan products offered for sale into one of the plurality of committed pools, respectively, in response to the single selection of the first graphical display element by the seller.

12. A non-transitory computer-readable medium comprising computer program instructions executable by at least one computer processor to perform a method for a seller to commit to a sale of loan products to selected buyers using an application with a graphical user interface presented in a display, the method comprising:
receiving, with the application, a plurality of bids offered by prospective buyers for loans previously made to borrowers and offered for sale by the seller to the prospective buyers with the application;
receiving, with the application, a market-price data feed including market prices of a plurality of benchmarks; and
presenting, with the application, for display together in a single graphical user interface each of:
a plurality of pools established by the seller within the single graphical user interface, each of the plurality of pools associated with a buyer who submitted a bid for each of the loan products included in the respective pool, the single graphical user interface configured for the seller to place each of the loan products offered for sale in one of the plurality of pools within the single graphical user interface, respectively, to establish a virtual commitment for each of the respective loan products, the virtual commitment having a bid price of record for a sales transaction not yet committed to by the seller, the bid price of record based, at least in part, on a current value of a selected one of the plurality of benchmarks, respectively; and
a first graphical display element configured to, in response to a single selection of the first graphical display element by the seller:
automatically commit to the sale of each of a plurality of loan products included in each of the plurality of pools together at the bid price of record, respectively, to create a binding agreement between the seller and the prospective buyer for the respective sale at the bid price of record.

13. The non-transitory computer readable medium of claim 12, the method further comprising:
in response to the single selection of the first graphical display element by the seller, automatically provide for each of the plurality of loan products included in each of the plurality of pools, with the application, a notification of the sale to the prospective buyer who provided a successful bid for the respective loan product, the notification including the bid price of record, the bid price of record reflecting the market price of the respective benchmark on which a value of the successful bid is determined at a time when the binding agreement is established, respectively.

14. The non-transitory computer readable medium of claim 12, the method further comprising:
presenting, with the application, for display in the single graphical user interface a second graphical display element configured to, in response to a single selection of the second graphical display element by the seller, initiate the receipt of the market prices and an automatic adjustment of a bid value of each of the plurality of bids to reflect an updated price of a known benchmark included in the plurality of benchmarks on which the bid value is determined, respectively, an adjusted value of each respective bid value being the bid price of record, the updated price reflecting any change in price of the respective known benchmark occurring in a period since an immediately preceding refresh of the market prices.

15. The non-transitory computer readable medium of claim 12, the method further comprising:
rendering both a plurality of virtual pools and a plurality of committed pools together for display in the single graphical user interface; and
moving by the seller, with the application, loan products within the virtual pools prior to the single selection of the first graphical display element by the seller.

16. The non-transitory computer readable medium of claim 15, the method further comprising organizing a subset of loan products together within a first virtual pool,
wherein the buyer offered a top bid from among all bids received for each of the loan products included in the subset of loan products, respectively.

17. The non-transitory computer readable medium of claim 16, wherein the subset of loan products is a first subset of loan products, wherein the buyer is a first buyer uniquely identified among all the prospective buyers and wherein the method further comprises organizing a second subset of loan products together within a second virtual pool,
wherein the second virtual pool includes a second buyer uniquely identified among all the prospective buyers, and wherein the second buyer offered a top bid from among all bids received for each of the loan products included in the second subset of loan products, respectively.

18. The non-transitory computer readable medium of claim 17, wherein the first buyer and the second buyer are the same buyer, and wherein the method comprises establishing by the seller, with the application, the first virtual pool and the second virtual pool as different pools based on values of parameters used to establish qualifications for the first subset of loan products and the second subset of loan products, respectively, a value of one or more parameters for the first subset of loan products different than a value of the same one or parameters for the second subset of loan products.

19. The non-transitory computer readable medium of claim 15, the method further comprising placing all loan products in at least one of the virtual pools in a selected one of the committed pools in response to the single selection of the first graphical display element by the seller.

20. The non-transitory computer readable medium of claim 19, the method further comprising:
- establishing by the seller, with the application, a pipeline including all the loan products offered for sale to the prospective buyers in a fixed period of time;
- placing all loan products offered for sale in one of the plurality of virtual pools, respectively; and
- moving all loan products offered for sale into one of the plurality of committed pools, respectively, in response to the single selection of the first graphical display element by the seller.

* * * * *